(12) United States Patent
Brisson et al.

(10) Patent No.: US 9,446,428 B2
(45) Date of Patent: Sep. 20, 2016

(54) METHOD OF DIP-COATING A SEGMENTED MULTIFOCAL LENS

(75) Inventors: Julien Brisson, Charenton-le-Pont (FR); Ricardo Salvatierra, Chihuahua (MX)

(73) Assignee: ESSILOR INTERNATIONAL (COMPAGNIE GENERALE D'OPTIQUE), Charenton-le-Pont (FR)

( * ) Notice: Subject to any disclaimer, the term of this patent is extended or adjusted under 35 U.S.C. 154(b) by 669 days.

(21) Appl. No.: 13/993,328

(22) PCT Filed: Dec. 16, 2010

(86) PCT No.: PCT/IB2010/003486
§ 371 (c)(1),
(2), (4) Date: Jun. 12, 2013

(87) PCT Pub. No.: WO2012/080775
PCT Pub. Date: Jun. 21, 2012

(65) Prior Publication Data
US 2013/0280422 A1    Oct. 24, 2013

(51) Int. Cl.
| | |
|---|---|
| B05D 1/18 | (2006.01) |
| B05C 3/02 | (2006.01) |
| B05C 13/02 | (2006.01) |
| B05C 3/09 | (2006.01) |
| B29D 11/00 | (2006.01) |

(52) U.S. Cl.
CPC . *B05D 1/18* (2013.01); *B05C 3/02* (2013.01); *B05C 3/09* (2013.01); *B05C 13/025* (2013.01); *B29D 11/00903* (2013.01)

(58) Field of Classification Search
None
See application file for complete search history.

(56) References Cited

U.S. PATENT DOCUMENTS

| | | | |
|---|---|---|---|
| 4,438,159 A | 3/1984 | Weber | |
| 2005/0123771 A1 | 6/2005 | Vaneeckhoutte et al. | |
| 2005/0254148 A1* | 11/2005 | Shimizu | B29D 11/00903 359/819 |
| 2009/0188429 A1 | 7/2009 | Caron et al. | |
| 2010/0171253 A1* | 7/2010 | Aiguebonne | B05C 3/09 269/55 |
| 2012/0176657 A1* | 7/2012 | Marinelli | B29D 11/00865 359/241 |
| 2013/0022739 A1* | 1/2013 | Biteau | B29D 11/00903 427/162 |

FOREIGN PATENT DOCUMENTS

EP     0 614 957     9/1994

OTHER PUBLICATIONS

International Search Report dated Sep. 12, 2011, corresponding to PCT/IB2010/003486.

* cited by examiner

*Primary Examiner* — Shamim Ahmed
*Assistant Examiner* — Bradford Gates
(74) *Attorney, Agent, or Firm* — Young & Thompson

(57) ABSTRACT

A method of dip-coating a segmented multifocal lens (1) having a segment with a curved portion and a straight line portion, includes the steps of: placing the lens (1) on a basket support (21); immersing the lens (1) vertically in a coating solution bath (16); and withdrawing the lens (1) vertically from the bath (16); wherein the step of placing the lens (1) is performed such that the straight line portion of the lens (1) is in a vertical plane; and wherein, before or during the step of immersing the lens (1), the lens (1) is inclined to an inclined position between a vertical position and a horizontal position of the lens (1), in which inclined position the segment is downwardly inclined and the straight line portion of the segment remains in the vertical plane.

20 Claims, 2 Drawing Sheets

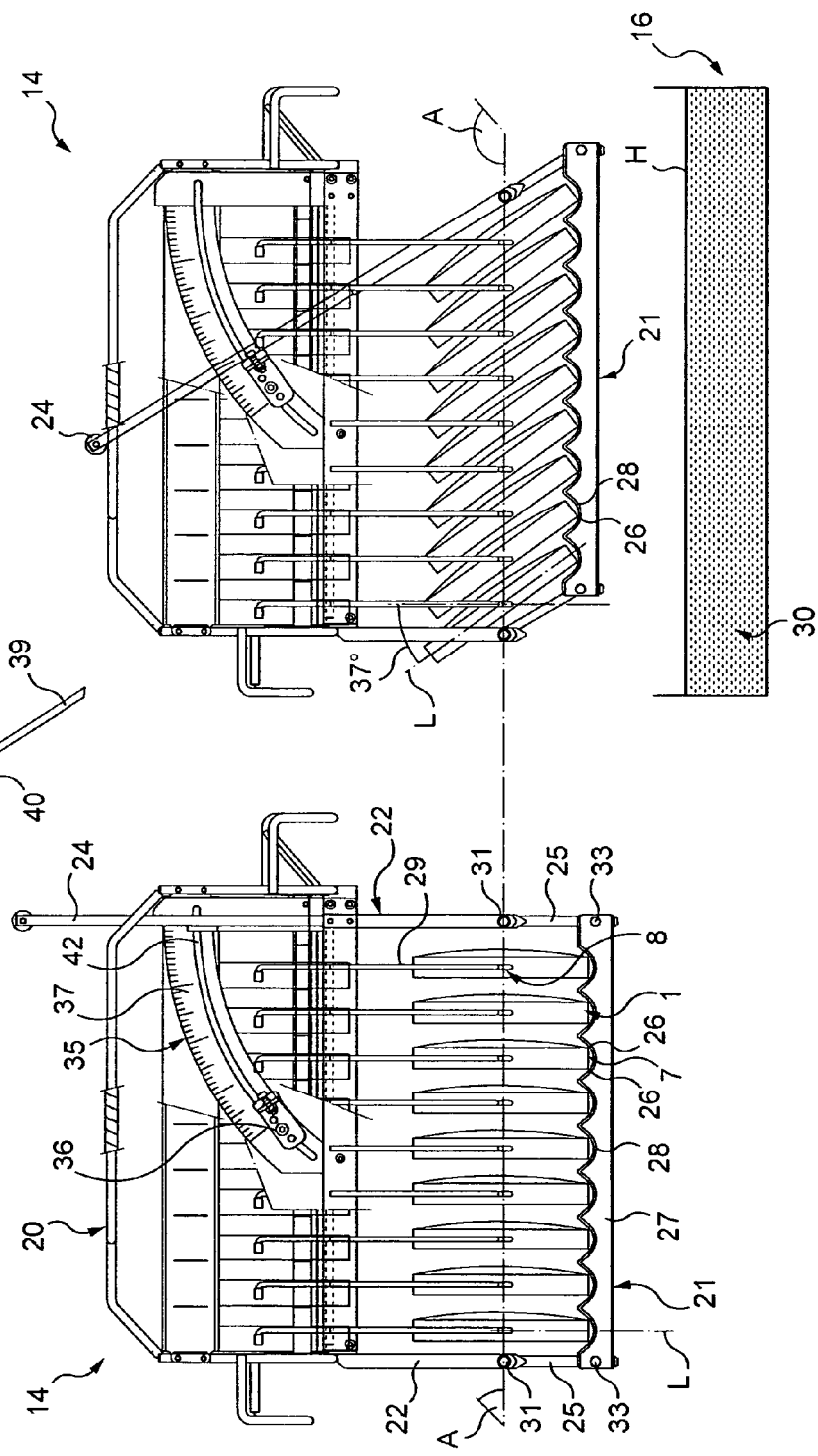

METHOD OF DIP-COATING A SEGMENTED MULTIFOCAL LENS

FIELD OF THE INVENTION

The invention relates to the dip-coating of a lens such as an ophthalmic lens, and in particular a segmented multifocal lens preferably with a high index.

The invention further relates to a carriage device for use in lens dip-coating and a segmented multifocal lens treatment system comprising such a carriage device.

BACKGROUND ART

It is well known that lenses, and in particular organic lenses, require treatment to increase the abrasion resistance of the lens, which is generally the adding of coating.

One known method for coating the surface of the lens, for instance with an anti-abrasive coating, is dip-coating.

In dip-coating, the lens is placed vertically on a basket support, then immersed vertically in a coating solution bath and then withdrawn vertically from the bath.

Vertically dip-coating is very convenient but, when the lens comprises a segment on the surface to be dip-coated, the segment having a curved portion and a straight line portion, there is often a drip line of coating extending from the straight line portion. This drip line comprises an elongated portion the end of which is in the form of a drop-shaped head.

In the case of vertically dip-coating, the drip line comprises a very short elongated portion and a large drop-shaped head which is close to the segment, and thus in the vision area of the lens. Consequently the drip line is obtrusive for the wearer of the lens.

To prevent this drip line, one known method of dip-coating is to withdrawn the lens with a tipping movement of the lens. Thereby, the lens is immersed vertically and during the withdrawing, the lens is tipped from a vertical position of the lens until, when fully withdrawn from the coating solution bath, it reaches a horizontal position of the lens.

Such tipping of the lens prevents the formation of a drip line but provides a coating thickness on the dip-coated surfaces of the lens which is too thick, and furthermore there is often a thickness variation of the coating between the top and the bottom of the lens. This thickness variation can lead to cracks on the surfaces of the lens when the coating on the coated-lens is cured.

The invention is directed to a method of dip-coating which limits both drip lines and thickness variations on the surface of the lens.

SUMMARY OF THE INVENTION

The invention accordingly provides a method of dip-coating a segmented multifocal lens having a segment with a curved portion and a straight line portion, the method comprising the steps of:
  placing the lens on a basket support;
  immersing the lens vertically in a coating solution bath having a horizontal coating solution surface; and
  withdrawing the lens vertically from said bath through said solution surface;
  wherein the step of placing the lens is performed such that the straight line portion of the lens is in a vertical plane; and
  wherein, before or during said step of immersing the lens, said lens is inclined to an inclined position between a vertical position and a horizontal position of the lens, in which inclined position said segment is downwardly inclined and said straight line portion of said segment remains in said vertical plane.

In other words, the lens is inclined during the step of placing the lens on the basket support, or between the steps of placing and immersing the lens, or during the step of immersing the lens, thus before the lens is in contact with the horizontal coating solution surface of the bath.

The invention is based on the observation that with the conventional dip-coating methods, either the drip line is in the vision area and thus is obtrusive or the coating thickness variation is too great and thus leads to cracks when the lens is finished.

Thanks to the invention, with the inclined position of the lens during both the immersing and withdrawing steps, the drip line has an elongated portion which is longer and thinner than in the state of the art, and the drop-shaped head is thus moved away from the segment, and in particular from an end of the straight line portion, until it reaches a non-vision area.

The drip line is elongated because the drop of coating hangs on the surface of the lens which has the segment (the surface partially overhangs the coating solution bath due to the inclination of the lens) and is subjected to gravity. Indeed, the area of contact between the drop of coating and the surface of the lens is reduced and thus the attraction force provided between the lens and the drop of coating (in other words the retention force acting on the drop of coating) is decreased.

The non-vision area is generally removed by grinding of a rim on the perimeter of the lens. Consequently, the drop-shaped head is totally removed and the elongated portion of the drip line is so thin that it is not obtrusive for the wearer of the lens. Furthermore, the coating on the coated-surfaces is thick enough, but not too thick, so that it resists abrasion without making cracks during its curing.

The method according to the invention is totally different from the known dip-coating methods because the lens remains inclined during the steps of immersing and withdrawing (thus the lens is not in a vertical position during these steps) and the lens is inclined to an inclined position without ever being in a horizontal position.

According to features preferred as being very simple, convenient and economical for embodying the method according to the invention:
  the step of placing the lens on the basket support is performed such that the lens is in a vertical position in which the straight line portion of the lens is vertical; and between the steps of placing and immersing the lens or during the step of immersing the lens, the method further comprises the step of moving the basket support with a movement of circular translation of the basket support, by virtue of which the lens is inclined to said inclined position; and/or
  the lens is withdrawn with a constant withdrawal speed, and preferably the withdrawal speed is comprised in a range from about 1 mm/s to about 2 mm/s; and/or
  the coating solution has a viscosity comprised in a range from about 3.8 mPa·s to about 4.3 mPa·s; and/or
  the coating solution has a solids content comprised in a range from about 34% to about 36%; and/or
  the lens has a first surface and a second surface to be dip-coated and a circle arc reference line intermediate said first surface and said second surface, and the lens is inclined such that the angle which the horizontal coating solution surface makes with the circle arc reference line in the inclined position of the lens is constant during the steps of immersing and withdrawing the lens, and preferably the angle is comprised in a range from about 25° to about 40°, and more preferably in a range from about 35° to about 39°.

According to other features preferred as being very simple, convenient and economical for embodying the method according to the invention, and in particular in order to limit vibration of the lens during its inclination and during the steps of immersing and withdrawing:

the basket support is fixed to a carriage structure, and the carriage structure comprises at least one arm configured to maintain the lens in its inclined position during the steps of immersing and withdrawing the lens; and/or the lens comprises a rim having at least one notch, and said at least one arm of the carriage structure comprises an end configured to be inserted into the slot to bear the lens when the lens is placed on the basket support and during the steps of immersing and withdrawing the lens; and/or the lens is inclined with a movement which is made with an axis of rotation passing through said at least one notch; and/or the basket support has at least one groove, and the lens comprises a rim having a portion placed in said at least one groove when the lens is placed on the basket support, said groove having a curved shape which is configured such that said portion of the rim remains in said groove when the lens is inclined;

The invention further provides a carriage device for use in the method, comprising a carriage structure and a basket support hung from the carriage structure, the basket support being configured to receive at least one lens to be dip-coated and the carriage structure comprising at least one arm configured to bear the at least one lens, wherein the basket support is movable with a movement of circular translation relative to the carriage structure to incline the at least one lens placed on the basket support to an inclined position between a vertical position and a horizontal position of the at least one lens.

According to other features preferred as being very simple, convenient and economical for embodying the carriage device according to the invention, and in particular in order to facilitate the inclination of the lens, and preferably without causing the lens to vibrate:

the basket support comprises two links attached to the carriage structure and a bottom plate joining the two links, the bottom plate being horizontal and being articulated relative to each link, and each link being articulated relative to the carriage structure via respective pivot points, said pivot points being in the same horizontal plane, by virtue of which the basket support is movable with a movement of circular translation and the bottom plate remains horizontal; and/or the basket support further comprises a lever fixed to one of said links, said lever being movable and configured to impart the circular translation movement to the basket support; and/or the carriage device further comprises a guide rail on which the lever is disposed, said guide rail preferably being arcuate; and/or the guide rail comprises a stop member which is movable and the lever is configured to come into abutment against said stop member; and/or the bottom plate comprises at least one groove configured to receive at least one lens; and/or the at least one arm of the carriage structure is configured to bear the lens at a fixed point which passes through an axis around which the lens is inclined, said axis belonging to the same horizontal plane as that of the pivot points; and/or the at least one arm of the carriage structure is articulated.

The invention further provides a segmented multifocal lens treatment system comprising a carriage device and a trigger tool configured to impart the circular translation movement to the basket support.

According to a feature preferred as being very simple, convenient and economical for embodying the treatment system according to the invention, and in particular to facilitate the automation of the movement of the basket support, and consequently the inclination of the lens, the trigger tool comprises a rod which is movable and the carriage device comprises a lever which is movable to impart the circular translation movement to the basket support and which is configured to enter into contact with said rod, and the trigger tool further comprises damper means configured to absorb a shock when the lever enters into contact with said rod and a travel limiting member configured to block said rod, by virtue of which the rod imparts a movement to the lever.

BRIEF DESCRIPTION OF THE DRAWINGS

The description of the invention now continues with a detailed description of a preferred embodiment given hereinafter by way of non-limiting example and with reference to the appended drawings. In these drawings:

FIG. 3 is a front view of the carriage device according to the invention, showing the lenses before their inclination and after their inclination;

DETAILED DESCRIPTION OF PREFERRED EMBODIMENTS

Figures 1, 5:
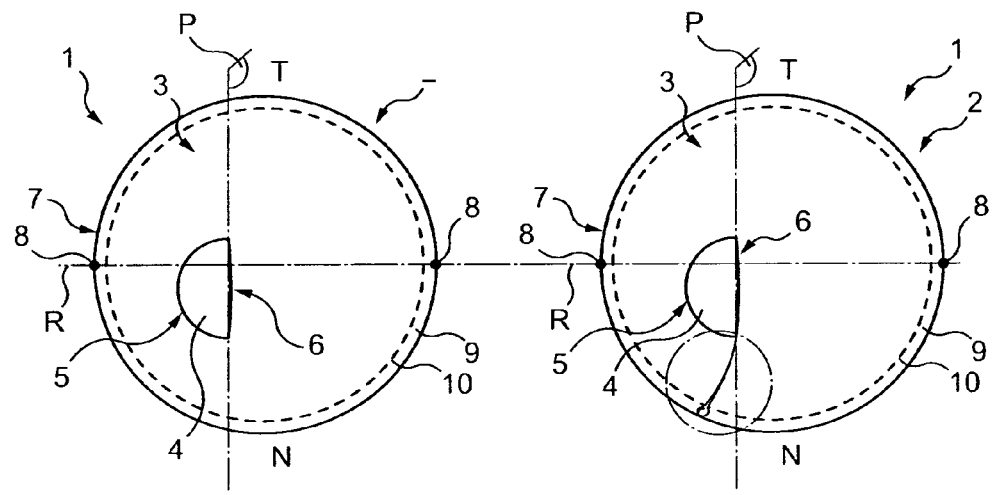
FIG. 1 is a schematic view of a segmented multifocal lens before treatment.
FIG. 5 is a schematic view of the segmented multifocal lens after treatment.

FIG. 1 shows a schematic view of a segmented multifocal lens 1 with high index, for example polythiourethane 1.67 compound (Stylis® commercialized by Essilor International), before treatment to increase the abrasion resistance of the lens 1.

The lens 1 is a spectacle lens made of thermoset material which has been molded in a mold (not represented) by casting.

The lens 1 has a first surface 2 which is convex and a second surface 3 which is concave.

A circle arc reference line L intermediate the convex and concave surfaces 2 and 3 of the lens 1 is defined (visible in FIG. 3).

The lens 1 has a segment 4 protruding from the concave surface 3.

The segment 4 comprises a curved portion 5 having a half-moon shaped and a straight line portion 6 (very slightly curved in FIG. 1 but substantially rectilinear).

The orientation of the lens 1 as shown in FIG. 1 is such that the straight line portion 6 of the segment 4 is vertical and in a vertical plane P. The lens 1 is here in a vertical position.

The lens 1 further comprises a rim 7 between the perimeter of the concave surface 3 and the perimeter of the convex surface 2.

The lens 1 comprises two diametrically opposite notches 8 configured on the rim 7 (schematically represented by two respective points in FIG. 1).

The two notches 8 result from the casting molding, and in particular from a mold gasket.

The notches 8 define an axis R passing through them.

The notches 8 and consequently the axis R enable identification of the vertical position of the lens 1, as detailed below.

As further detailed below, the axis R is also a rotational axis.

The lens 1 further comprises a non-vision area 9 defined in FIG. 1 as a peripheral margin between the perimeter of the concave surface 3 and a dashed line 10 indicated on said concave surface 3.

As we will see below, the non-vision area 9 is removed by grinding the rim 7 of the lens 1 after proceeding to the treatment.

It should be noted that FIG. 1 shows the lens 1 before treatment in a predetermined orientation. When the lens 1 is mounted on a spectacle frame, the lens 1 is rotated by quarter-turn to the left (in other words anti-clockwise).

Said lens 1 is a right eye lens for spectacles such that when the lens 1 is mounted on said spectacles and worn by a wearer of the spectacles, the side of the lens 1 denoted T, as temporal, is near the temple of the wearer, and the side of the lens 1 denoted N, as nasal, is near the nose of the wearer.

Figure 2:
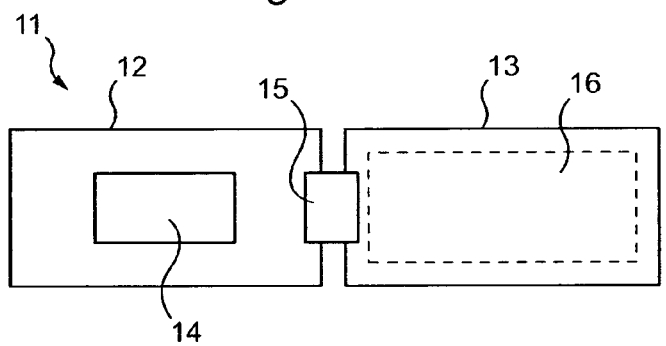
FIG. 2 is a view of a treatment system comprising a carriage device on which are disposed a plurality of these lenses.

FIG. 2 partially shows a treatment system 11 for treating a plurality of lenses 1, including the dip-coating of the surfaces 2 and 3 of each lens 1 with a coating having two layers.

The treatment system 11 comprises a preparation module (not shown), a first layer coating module (not shown), a cooling module 12, a second layer coating module 13 and a pre-curing module (not shown).

The treatment system 11 further comprises a carriage device 14 which carries a plurality of lenses 1 and a trigger tool 15 provided between the cooling module 12 and the second layer coating module 13. The function of said trigger tool 15 will be detailed below.

The carriage device 14 is movable from one module to another.

In the preparation module (not shown), the lenses 1 are placed vertically on the carriage device 14 in the predetermined orientation disclosed in FIG. 1.

In the first layer coating module, the lenses 1 are immersed vertically in a first layer coating solution bath (not shown), for example of polyurethane latex, then the lenses 1 are withdrawn vertically from said bath.

In the cooling module 12, the carriage device 14 is parked for a predetermined period.

Next, the carriage device 14 moves to the second layer coating module 13. As detailed below, the lenses 1 are inclined due to the contact between the carriage device 14 and the trigger tool 15. The lenses 1 are next immersed vertically (in their inclined position) in a second layer coating solution bath 16 and withdrawn from said bath 16. The second layer of coating is a sol-gel base made for example as example 3 illustrated to EP 0 614 957 B1.

Next the carriage device 14 moves to the pre-curing module (not shown) in which it is parked for another predetermined period.

Consequently, the lenses 1 are coated with a coating made of two layers. The sol-gel base solution includes methanol such that the viscosity of it is decreased and comprised in a range from about 3.8 mPa·s to about 4.3 mPa·s.

This viscosity is the dynamic viscosity measured by a viscosity measuring apparatus of the "Brookfield BV™" type.

One way to define the dynamic viscosity is to consider a first layer and a second layer of the coating solution, the first layer having a speed relative to the second layer. Due to the viscosity, a force is exerted on the second layer. The dynamic viscosity is defined by the following relation:

$$F = \mu \times S \times \frac{dv}{dz};$$

wherein:
F is the force exerted on the second layer;
μ is the dynamic viscosity;
S is the area of each layer;
dv is said relative speed; and
dz is the distance between the first and the second layer.

Furthermore, the sol-gel base solution has a solids content comprised in a range from about 34% to about 36%.

Figure 4:
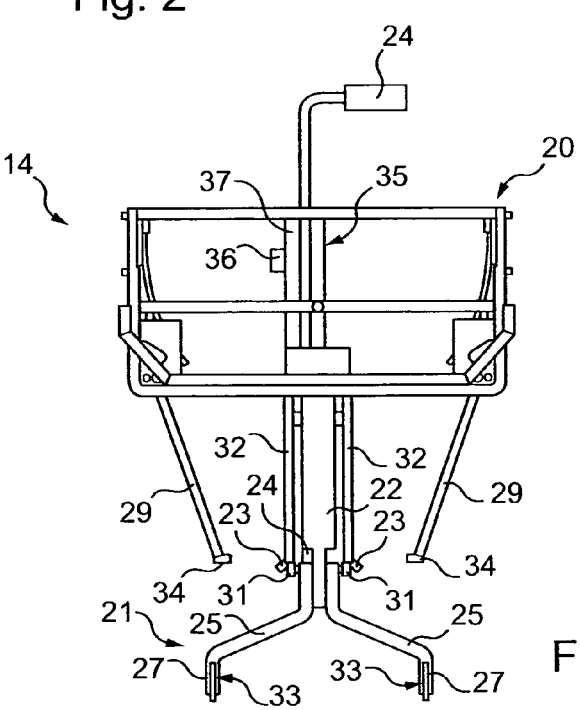
FIG. 4 is a right side view of the carriage device.

We will now describe in detail the carriage device 14 and the step of coating the lenses 1 with sol-gel base solution with reference to FIGS. 3 and 4.

The carriage device 14 comprises a carriage structure 20 and a basket support 21 hung from the carriage structure 20.

The carriage structure 20 comprises two opposite long links 22, a lever 24 provided along one of the links 22 and being longer than said link 22, an arcuate guide rail 35 and pairs of arms 29 each comprising an articulated arm 29 and a fixed arm 32.

The lever 24 is configured to slide along the guide rail 35.

The lever 24 is slidable on the guide rail 35 via a pulley (not shown) disposed on the upper edge of the guide rail 35.

As shown in FIG. 4, the articulated arms 29 are respectively disposed on a front face and on a rear face of the carriage device 14 and the fixed arms 32 are disposed in the center of said carriage device 14, between the articulated arms 29.

The arms 29 and 32 are aligned in fours (two arms 29 and two arms 32) and the carriage structure 20 comprises eighteen pairs of arms 29 and 32 and thus nine groups of four aligned arms.

Each articulated arm 29 comprises a first end 34 extending horizontally towards a fixed arm 32 which face said articulated arm 29.

Furthermore, each fixed arm 32 comprises a second end 23 which is inclined relative to the general orientation of said fixed arm 32, which is vertical, and said second end 23 is inclined downwards.

Each first end 34 and second end 23 which face are disposed on the same respective horizontal axis (not shown).

The guide rail 35 which is arcuate comprises a space in which the lever 24 is slidable, a stop member 36 formed by a magnet and a slot 42 provided along the guide rail 35, in which slot 42 the magnet 36 is adapted to be movable.

The lever 24 is adapted to come into abutment against said magnet 36.

The guide rail 35 further comprises a scale 37 in order to indicate the inclination of said lever 24, and thus the inclination of the lenses 1 as detailed below.

The basket support 21 comprises four short links 25 which are curved with two curved portions, two of said links 25 being on the left side of the carriage device 14 and two other of said links 25 being on the right side of the carriage device 14 so that two short links 25 face two other short links 25.

The basket support 21 further comprises two bottom plates 27, each of which joins two opposite short links 25.

Each bottom plate 27 comprises nine grooves 28 each configured to receive a lens 1, and in particular the nasal side of said lens 1.

Each groove 28 has a radius of curvature comprised in a range from about 0.6 cm to about 1.4 cm.

Each short link 25 is articulated around a pivot point 33 to the bottom plate 25 at which said short link 25 is joined.

All the pivot points 33 are situated on the same horizontal plane (not shown).

Furthermore, two short links 25 are hung from a long link 22 and two other short links 25 are hung from the other long link 22.

Each short link 25 is also articulated around respective pivot point 31 to the respective long link 22 to which said short link 25 is joined.

All the pivot points 31 are in the same horizontal plane A, which is parallel to the horizontal plane comprising all the pivot points 33.

The basket support 21 is thus movable with a movement of circular translation relative to the carriage structure 20.

The lever 24 and the short link 25 which is on the right side and on the front face of the carriage device 14 are fixed to each other such that the movement of circular translation of the basket support 21 can be imparted by the lever 24.

We will now describe in detail the trigger tool 15 with reference to FIG. 3.

The trigger tool comprises a slide member 38 having a hook shaped for its attachment to the structure (not shown) of the treatment system 11.

The trigger tool 15 further comprises a rod 39 pivotally attached to the member 38 such that the rod 39 is movable around a pivot point 40.

The trigger tool 15 comprises a spring 41 wound around the pivot point 40, said spring 41 having functions of damping and limiting the travel of the rod 39 as detailed below.

We will now describe the steps of moving the carriage device 14 from the cooling module 12 to the second layer coating module 13 and the step of dip-coating the lenses 1 mounted on the carriage device 14 with reference to FIG. 3.

As shown on the carriage device 14 on the left in FIG. 3, two groups of nine lenses 1 are placed on the basket support 21.

Each lens 1 is oriented as shown in FIG. 1 and remains in the respective groove 28 of the bottom plate 27. Two opposite edges 26 of each lens 1 which respectively correspond to the perimeter of the surfaces 2 and 3 are in contact with the bottom plate 27, at the location of the groove 28.

Each lens 1 is maintained in a vertical position and in a vertical plane by two opposite arms 29 and 32.

The arm 29 is articulated such that the lens 1 can then be placed between the two arms 29 and 32 and the second end 23 of the fixed arm 32 inserted in the notch 8 of the lens 1 which faces said second end 23 and before the articulated arm 29 is articulated such that first end 34 of said arm 29 may then be inserted in the opposite notch 8 of the lens 1 which faces said first end 34.

Next, the carriage device 14 moves from the cooling module 12 to the second layer coating module 13.

During this displacement, the lever 24 of the carriage device 14 enters into contact with the rod 39 of the trigger tool 15.

The lever 24 pushes the rod 39 until said rod 39 is blocked due to the spring 41 which acts as a limiter and as damper in order to avoid a rough contact between said lever 24 and said rod 39.

Thus, the rod 39 imparts a movement to the lever 24 which slides in the guide rail 35.

The magnet 36 has been beforehand placed in a predetermined position on the guide rail 35 corresponding to the inclination angle that each lens 1 must have for the dip-coating.

The travel limiting member 41 of the rod 39 is thus set according to said inclination angle to impart a corresponding movement to the lever 24.

Here, as shown on the carriage device 14 on the right in FIG. 3, the lever 24 and thus each lens 1 are inclined in an inclined position between a vertical position and a horizontal position, with an inclination angle equals to 37°+/−2°.

The inclination angle corresponds to the angle which the horizontal coating solution surface H makes with the circle arc reference line L in said inclined position of each lens 1.

Further, said angle is constant during the steps detailed below of immersing and withdrawing the lenses 1 via the carriage device 14.

In said inclined position, the segment 4 is downwardly inclined and the straight line portion 6 of said segment 4 remains in the vertical plane P.

In said inclined position, each lens 1 is moreover rotated around the axis R described above.

The inclination of the lenses 1 is due to the movement of the basket support 21 which is moved by the lever 24.

Indeed, said lever 24 is configured to move the short link 25 and thus all the other short links 25 and the two bottom plates 27 are moved.

The bottom plates 27 remains horizontal during the movement of the basket support 21.

Thus, as each lens 1 is maintained by respective arms 29 and 32, each lens 1 is inclined with a predetermined angle of inclination.

Each lens 1 is borne by two fixed points situated on the axis R around which the lens is inclined, said axis belonging to the same horizontal plane A as that of the pivot points 31.

In said inclined position, only one edge 26 which corresponds to the perimeter of the surface 3 rests against the bottom plate 27 in the groove 28.

To reach the inclined position, the lens 1 moves away towards the back part of the groove 28 by turning around the edge 26 of the surface 3. Thus, the lens 1 is not placed at the lowest point of the groove 28 but remains in the groove 28.

Said edge 26 of each lens 1 can be moved on the bottom plate 27 in the respective groove 28.

The carriage device 14 is next moved vertically downwards until all the lenses 1 are immersed in the coating solution bath 16 which comprises the coating solution 30.

All the lenses 1 pass through the horizontal coating solution surface H, said lenses 1 being in the inclined position.

Then, the carriage device 14 is withdrawn vertically such that the lenses 1 are withdrawn vertically from said bath 16 through said solution surface H.

The withdrawal speed is constant and slow and comprised in a range from about 1 mm/s to about 2 mm/s.

It is important that the lenses 1 are maintained in the inclined position during the steps of immersing and withdrawing said lenses in the coating solution bath 16.

After the dip-coating of the lenses 1 with the sol-gel base solution 30, the carriage device 14 moves to the pre-curing module (not shown).

Figure 6:
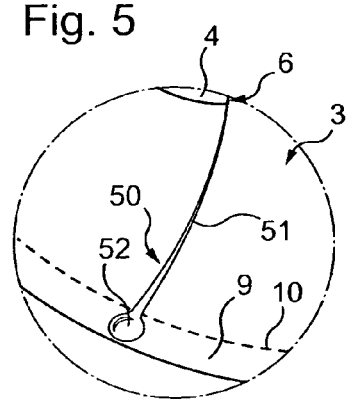
FIG. 6 is a detail of FIG. 5.

We will now describe in detail the result of the dip-coating in the module 13 with reference to FIGS. 5 and 6.

The lens 1 shown in FIG. 5 is the same as the lens 1 shown in FIG. 1 but dip-coated.

The lens 1 comprises after treatment a drip defect 50 formed by a drip line of coating extending from one end of the straight line portion 6.

This drip line 50 comprises a very thin and very long elongated portion 51 and a drop-shaped head 52 at the end of the elongated portion 51.

As shown in FIG. 6, the drop-shaped head 52 is situated in the non-vision area 9, in other words between the perimeter of the surface 3 and the dashed line 10.

The elongated portion 51 has a length greater than 5 mm from the end of the straight line portion 6.

The greatest width of the drip line 50 is at the drop-shaped head 52 which has a width comprised in a range from about 2 mm to about 5 mm.

The elongated portion 51 is so thin that the defect remaining on the lens 1 after grinding of the rim 7, and thus the grinding away of the drop-shaped head 52, is not obtrusive for the wearer of the lens and aesthetically acceptable.

Further, thanks to the parameters of the coating solution 30, and thanks to the inclined position of the lens 1 during the steps of immersing and withdrawing, the thickness requirement of the coating on the lens 1 are respected. The thickness is for example 3.5 microns +/−0.5 such that the abrasion resistance criteria are achieved.

In a variant, the carriage device comprises a stop member adapted to prevent the lever from moving from a position in which the lever is vertical or inclined to another position in which the lever is more inclined, and the carriage device further comprises a backstop member adapted to prevent the lever from moving from a position in which the lever is inclined to another position in which the lever is less inclined or vertical.

In others variants not illustrated:
the lenses are inclined with an angle comprised in a range from about 25° to about 40°, and preferably in a range from about 35° to about 39°;
the lenses are placed on the basket support directly in their inclined position;
the lenses are inclined in their inclined position during the step of immersing the lenses in the second layer solution bath;
the lenses are inclined to the inclined position in the step of immersing the lenses in the first layer coating bath and remain inclined until the end of the treatment;
all the arms are movable;
a layer of latex is provided on the bottom plate to avoid slippage of lenses;
the lever and the short link are made as a single part;
the guide rail comprises notches and the lever is configured to engage with said notches.

Numerous other variants are possible depending on circumstances, and in this regard it is pointed out that the invention is not limited to the examples described and shown.

The invention claimed is:

1. A method of dip-coating a segmented multifocal lens (1) having a segment (4) with a curved portion (5) and a straight line portion (6), the method comprising the steps of:
placing the lens (1) on a basket support (21);
immersing the lens (1) vertically in a coating solution bath (16) having a horizontal coating solution surface (H); and
withdrawing the lens (1) vertically from said bath (16) through said solution surface (H);
wherein the step of placing the lens (1) is performed such that the straight line portion (6) of the lens (1) is in a vertical plane (P); and
wherein, before or during said step of immersing the lens (1), said lens (1) is inclined to an inclined position between a vertical position and a horizontal position of the lens (1), in which inclined position said segment (4) is downwardly inclined and said straight line portion (6) of said segment (4) remains in said vertical plane (P).

2. The method according to claim 1, wherein the step of placing the lens (1) on the basket support (21) is performed such that the lens (1) is in a vertical position in which the straight line portion (6) of the lens (1) is vertical; and between the steps of placing and immersing the lens (1) or during the step of immersing the lens (1), the method further comprises the step of moving the basket support (21) with a movement of circular translation of the basket support (21), by virtue of which the lens (1) is inclined to said inclined position.

3. The method according to claim 1, wherein the lens (1) is withdrawn with a constant withdrawal speed in a range from about 1 mm/s to about 2 mm/s.

4. The method according to claim 1, wherein the coating solution (30) has a viscosity comprised in a range from about 3.8 mPa·s to about 4.3 mPa·s.

5. The method according to claim 1, wherein the coating solution (30) has a solids content comprised in a range from about 34% to about 36%.

6. The method according to claim 1, wherein the lens has a first surface (2) and a second surface (3) to be dip-coated and a circle arc reference line (L) intermediate said first surface (2) and said second surface (3), and the lens (1) is inclined such that the angle which the horizontal coating solution surface (H) makes with the circle arc reference line (L) in the inclined position of the lens (1) is constant during the steps of immersing and withdrawing the lens (1), and the angle is comprised in a range from about 25° to about 40°.

7. The method according to claim 1, wherein the basket support (21) is fixed to a carriage structure (20), and the carriage structure (20) comprises at least one arm (29, 32) configured to maintain the lens (1) in its inclined position during the steps of immersing and withdrawing the lens (1).

8. The method according to claim 7, wherein the lens (1) comprises a rim (7) having at least one notch (8), and said at least one arm (29, 32) of the carriage structure (20) comprises an end (34, 23) configured to be inserted into the slot (8) to bear the lens (1) when the lens (1) is placed on the basket support (21) and during the steps of immersing and withdrawing the lens (1).

9. The method according to claim 8, wherein the lens (1) is inclined with a movement which is made with an axis of rotation (R) passing through said at least one notch (8).

10. The method according to claim 1, wherein the basket support (21) has at least one groove (28), and the lens (1) comprises a rim (7) having a portion (26) placed in said at least one groove (28) when the lens (1) is placed on the basket support (21), said groove (28) having a curved shape which is configured such that said portion (26) of the rim (7) remains in said groove (28) when the lens (1) is inclined.

11. A carriage device for use in the method according to claim 1, comprising a carriage structure (20) and a basket support (21) hung from the carriage structure (20), the basket support (21) being configured to receive at least one lens (1) to be dip-coated and the carriage structure (20)

comprising at least one arm (29,32) configured to bear the at least one lens (1), wherein the basket support (21) is movable with a movement of circular translation relative to the carriage structure (20) to incline the at least one lens (1) placed on the basket support (21) to an inclined position between a vertical position and a horizontal position of the at least one lens (1).

12. The carriage device according to claim 11, wherein the basket support (21) comprises two links (25) attached to the carriage structure (20) and a bottom plate (27) joining the two links (25), the bottom plate (27) being horizontal and being articulated relative to each link (25), and each link (25) being articulated relative to the carriage structure (20) via respective pivot points (31), said pivot points (31) being in the same horizontal plane (A), by virtue of which the basket support (21) is movable with a movement of circular translation and the bottom plate (27) remains horizontal.

13. The carriage device according to claim 12, wherein the basket support (21) further comprises a lever (24) fixed to one of said links (25), said lever (24) being movable and configured to impart the circular translation movement to the basket support (21).

14. The carriage device according to claim 13, wherein it further comprises a guide rail (35) on which the lever (24) is disposed, said guide rail (35) preferably being arcuate.

15. The carriage device according to claim 14, wherein the guide rail (35) comprises a stop member (36) which is movable and the lever (24) is configured to come into abutment against said stop member (36).

16. The carriage device according to claim 12, wherein the bottom plate (27) comprises
at least one groove (28) configured to receive at least one lens (1).

17. The carriage device according to claim 12, wherein the at least one arm (29, 32) of the carriage structure (20) is configured to bear the lens at a fixed point (8) which passes through an axis (R) around which the lens (1) is inclined, said axis (R) belonging to the same horizontal plane (A) as that of the pivot points.

18. The carriage device according to claim 11, wherein the at least one arm (29, 32) of the carriage structure (20) is articulated.

19. A segmented multifocal lens treatment system comprising a carriage device according to claim 11 and a trigger tool (15) configured to impart the circular translation movement to the basket support (21).

20. The treatment system according to claim 19, wherein the trigger tool (15) comprises a rod (39) which is movable and the carriage device (20) comprises a lever (24) which is movable to impart the circular translation movement to the basket support (21) and which is configured to enter into contact with said rod (39), and the trigger tool (15) further comprises damper means (41) configured to absorb a shock when the lever (24) enters into contact with said rod (39) and a travel limiting member (41) configured to block said rod (39), by virtue of which the rod (39) imparts a movement to the lever (24).

\* \* \* \* \*